Oct. 20, 1936. S. HOROWITZ ET AL 2,058,080
BUMPER OPERATED SAFETY DEVICE FOR MOTOR VEHICLES
Filed Sept. 23, 1933 2 Sheets-Sheet 2
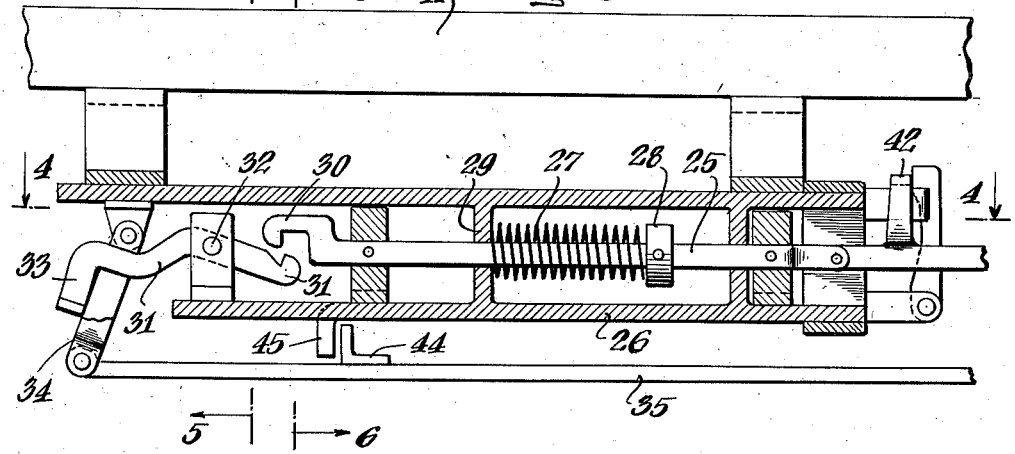
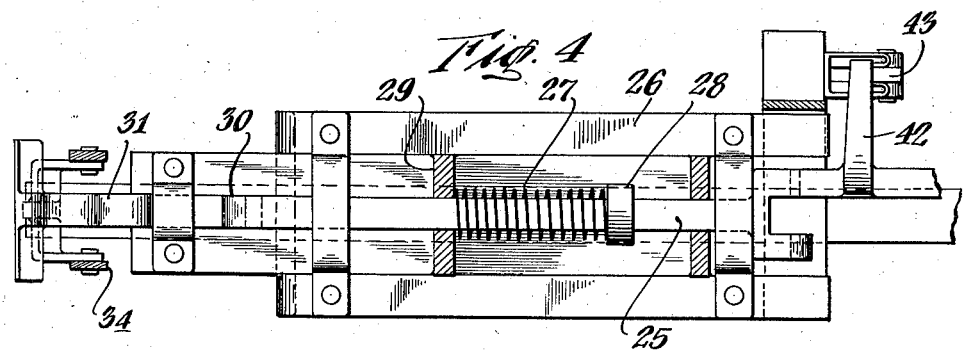
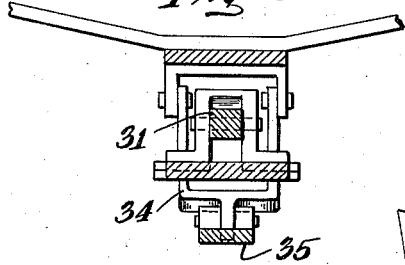
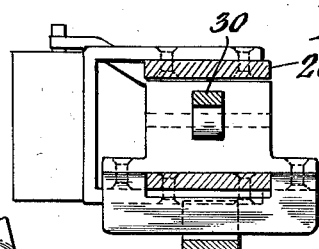
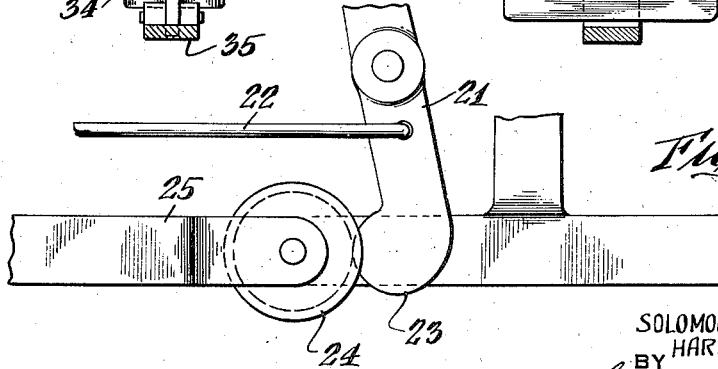
INVENTORS
SOLOMON HOROWITZ
HARRY HOROWITZ
BY
ATTORNEY Patented Oct. 20, 1936

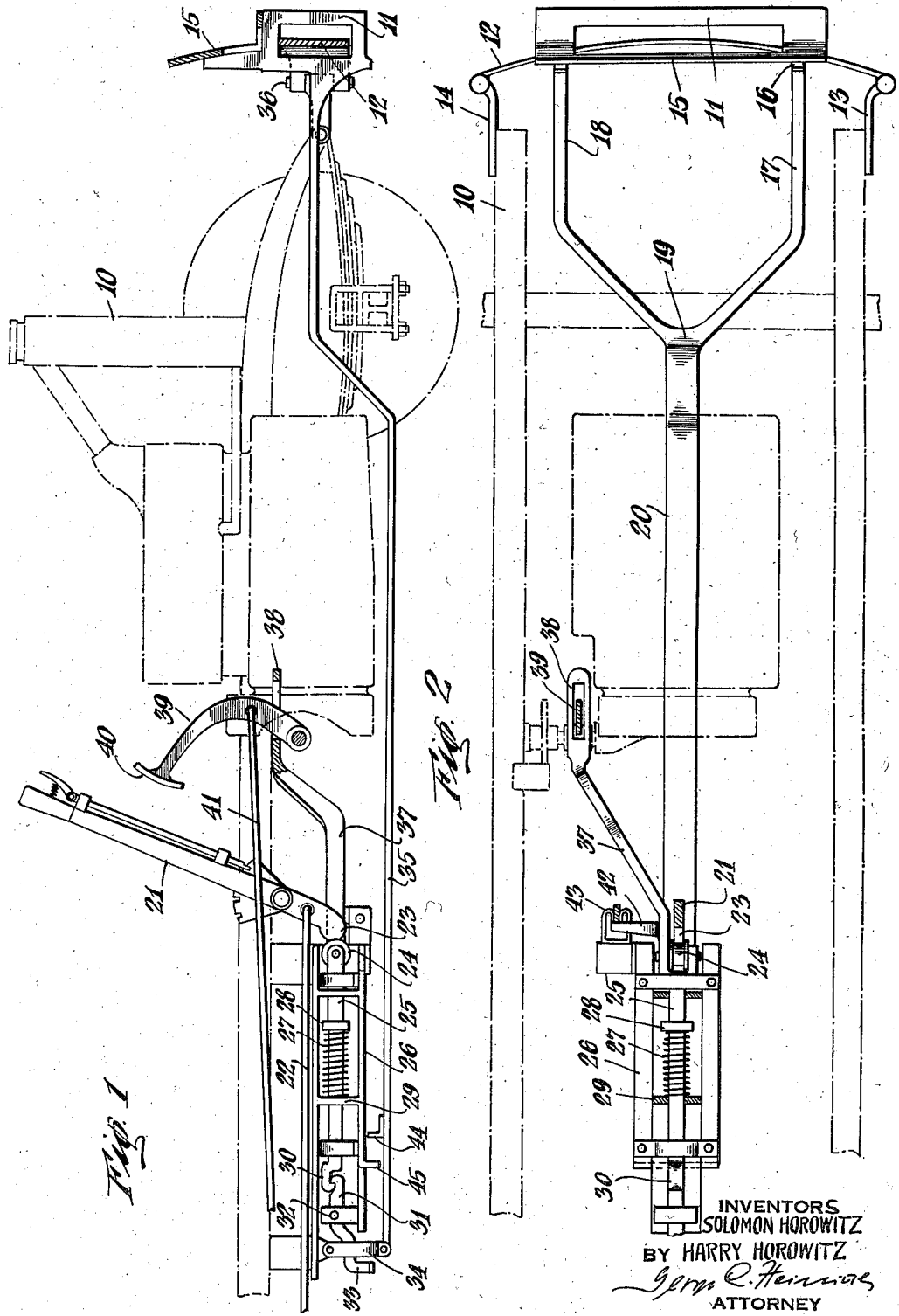

2,058,080

UNITED STATES PATENT OFFICE 2,058,080

BUMPER OPERATED SAFETY DEVICE FOR MOTOR VEHICLES

Solomon Horowitz and Harry Horowitz, New York, N. Y.

Application September 23, 1933, Serial No. 690,649

1 Claim. (Cl. 180—83)

This invention relates to improvements in vehicle brake operating means particularly to bumper operated means for instantaneously applying the brakes of the vehicle in cases of emergency.

It is the principal object of our invention to provide a novel and improved means to operate the emergency brake of a motor vehicle as soon as the front bumper thereof meets with an obstruction and to reset the bumper automatically after each operation.

Another object of our invention is the provision of a mechanism for operating simultaneously with the application of the emergency brake the foot brake and to automatically open the ignition circuit.

Still another object of our invention is the provision of a bumper operated braking device for automobiles of comparatively simple construction yet durable and highly efficient in its operation.

A further object of our invention is the provision of a means to cushion the bumper and to provide a seat thereon apt to catch a person in the path of the vehicle and colliding therewith.

A still further object of our invention is the provision of a bumper operated brake for motor vehicles including means to set the emergency and foot brakes upon the release of a spring controlled clutch by the rearward movement of the bumper when striking an obstacle.

These and other objects and advantages of our invention will become more fully known as the description thereof proceeds and will then be more specifically defined in the appended claim.

In the accompanying drawings forming a material part of this disclosure:

Fig. 1 is a side elevation of an automobile frame equipped with a bumper operated brake constructed according to our invention.

Fig. 2 is a top plan view thereof.

Fig. 3 is a fragmentary sectional side elevation of the spring controlled clutch mechanism.

Fig. 4 is a top plan view thereof.

Fig. 5 is a section on line 5—5 of Figure 3.

Fig. 6 is a section on line 6—6 of Figure 3.

Fig. 7 is a fragmentary detail view of the emergency brake operating mechanism.

As illustrated, an automobile or motor vehicle is equipped in front of its body frame 10 with a bumper 11 consisting of a forwardly curved rod 12 attached to the sides of the body frame by suitable brackets 13, 14.

The bumper 11 has the form of a frame provided at its top with a seat 15 adapted to seat a person colliding with the bumper.

The frame of the bumper 11 is guided in the perforated uprights 16 at the outer end of a fork-shaped member 17, 18, the prongs of which are united in rear of the bumper as at 19 to form a rearwardly extending beam or bar 20 to which is connected the lever 21 of the emergency brake operated by a rod 22 in the usual well known manner.

This lever 21 is engaged near its lower rounded end 23 by a roller 24 at the inner end of a slide rod 25, sliding in a frame 26.

A strong spring 27 is wound about the rod 25 within its frame between a collar 28 on rod 25 and a post 29 of frame 26.

The outer end of the rod 25 is formed into a hook 30 adapted to be engaged by a hook 31 pivoted intermediate its ends as at 32.

The extreme outer end of hook 31 has formed therewith an operating member 33 adapted to engage upon the setting of the brake a substantially U-shaped frame 34 pivotally suspended from a bracket of the automobile frame.

To the lower end of a frame 34 is pivotally attached one end of a rod 35 connected at its other end to the bumper, as at 36 to reset the same after each operation automatically.

To frame 26 at its inner part is connected an angular bar 37 having a slotted front part 38 through which the lever 39 of a foot brake 40 extends connected by its rod 41 with the foot brake of the automobile in the usual manner.

To bar 37 is connected or made integrally therewith a laterally extending finger 42 adapted to throw the arm of a switch indicated at 43 to open the ignition circuit upon the operation of the brakes by the bumper.

The forward movement of frame 26 will engage abutments 45 and 44 and push rod 35 forward to set the bumper again assisted by the engagement of hook 33 with member 34, while a person hit by the bumper may be picked up by the seat 15.

The device operates as follows: When the bumper 11 strikes a person or an object in the path of the automobile, the frame 17, 18 and the rearwardly extending rod or bar 20 thereof will move rearwardly, and this movement will operate the lever 21 of the emergency brake passed through bar 20, so as to engage the lower rounded end 23 of lever 21 with a roller 24 at the inner end of the rod 25 arranged in a slidable frame 26, being normally held in its retracted position by means of spring 27. The rearward movement of rod 25 will tension the spring 27 between collar 28 and bar 29, and disengage hooks 30 and 31. The rod 35 being connected to the bumper at one end and to the U-frame at its other end, will participate in the rearward movement of the bumper, and swing the U-frame about its pivot point into engagement with the weighted rear end 33 of hook 31 to turn the same about its pivot pin 32 while its hooked end 31 is disengaged from hook 30.

During the rearward movement of the frame 26, the bar 37 connected therewith will operate the foot-brake lever 39 and the finger 42 to open the switch 43 and the ignition circuit.

Upon the disengagement of the hooks 30 and 31, the spring 27 will expand again and engage hooks 30 and 31 again, as during the movement of frame 26 inwardly, its abutment 45 will come into engagement with abutment 44 on rod 35 to move the same towards the bumper for resetting the same, and thus allow the weighted end 33 of hook 31 to be disengaged from the U-frame and to be gripped by hook 30, while the emergency brake and the foot brake have been released and the finger 42 has closed the switch 43 and the ignition circuit for the normal operation of the car.

It will be understood that we have described and shown the preferred form of our device only, as one example of the many possible ways to practically construct the same, and that we may make such changes in the general arrangement of our device and in the construction of its minor details as come within the scope of the appended claim without departure from the spirit of our invention and the principles involved.

Having thus described our invention, what we claim as new and desire to secure by Letters Patent is:

In a safety device for motor propelled vehicles, a bumper frame presenting a seat to seat a person colliding with the bumper, a rearwardly extending bar connected to said frame through which the operating lever of the emergency brake extends, a slide rod having a roller at one of its ends to be engaged by the rounded end of said operating lever upon the rearward movement of said frame to operate the emergency brake, a frame for said slide rod, a strong spring wound about said slide rod, a hook formed with the other end of said slide rod, a hook member pivoted intermediate its ends to the vehicle frame adapted to engage the hook end of said rod and held in engagement therewith by said spring, a substantially U-shaped frame pivotally suspended from the vehicle-frame, a rod connected to said U-frame and the bumper, abutments on said slide frame and on said rod connected to the U-frame, said U-frame adapted to engage the rear end of said pivoted hook member to disengage it from the hook on said slide rod upon the rearward movement of said slide rod to tension its spring, an emergency brake, a foot brake, connections between said foot brake and the frame for said slide rod including a finger, said emergency brake and foot brake to be set upon the rearward movement of said bumper frame to tension said spring and disengage said hook members, said spring expanding upon the disengagement of said members, and said abutments engage to move the rod and U-frame to reset the bumper and allow an engagement of the hook members and a resetting of the emergency and foot brakes, and a switch to be opened by said finger upon the rearward movement of the bumper frame to open the ignition circuit, and to be closed by said finger to close the ignition circuit again upon the resetting of said brakes.

SOLOMON HOROWITZ.
HARRY HOROWITZ.